Figure 1:
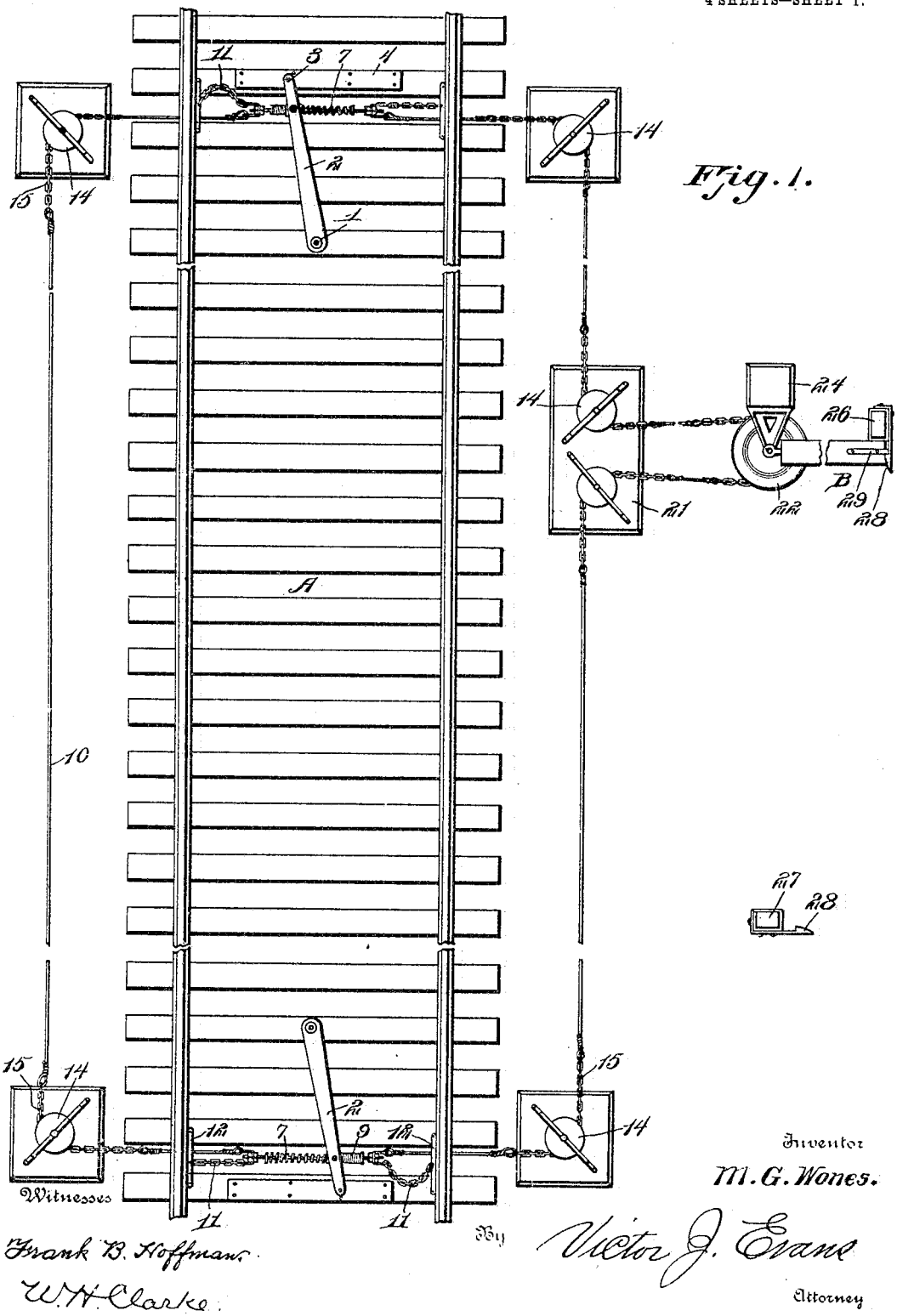

No. 782,093. PATENTED FEB. 7, 1905.
M. G. WONES.
GATE.
APPLICATION FILED SEPT. 17, 1904.
4 SHEETS—SHEET 2.
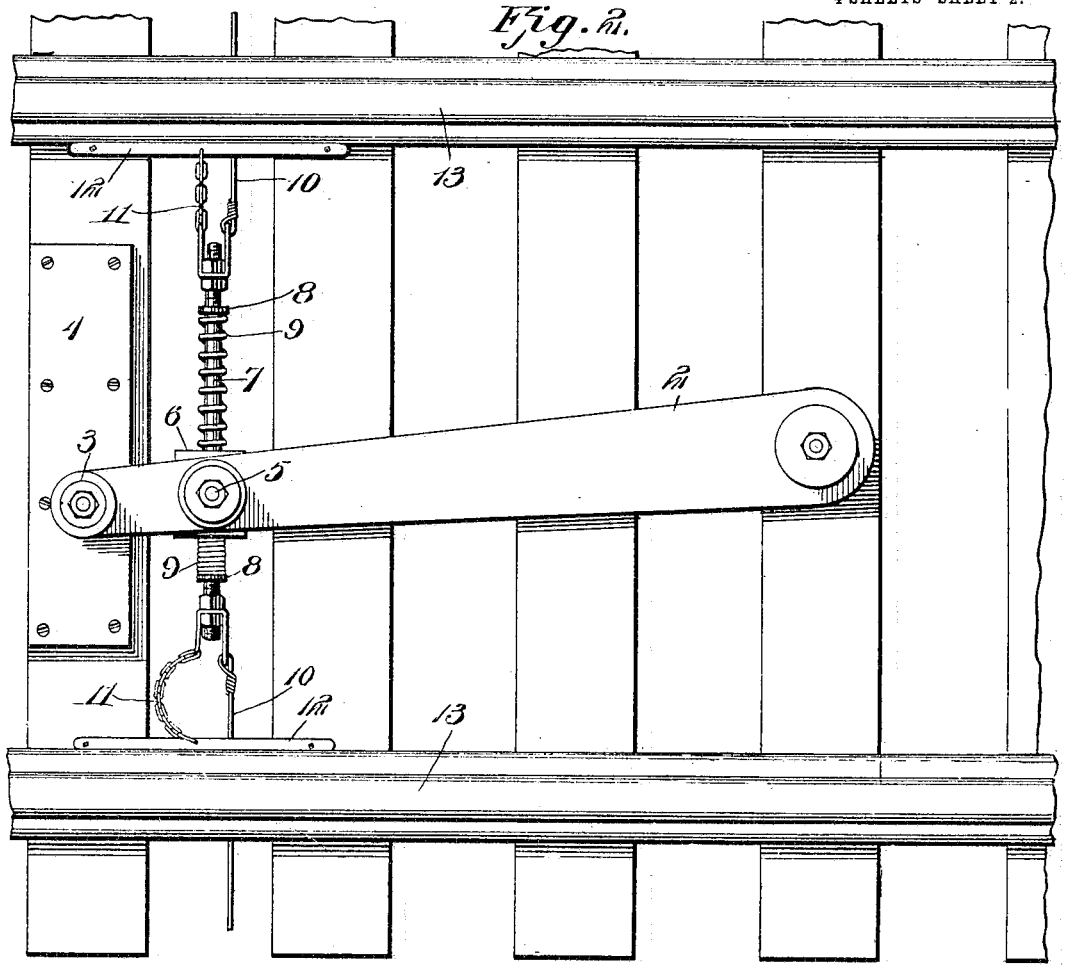
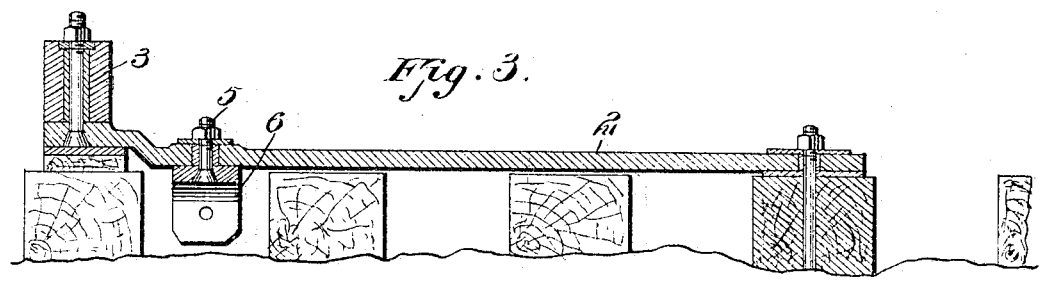

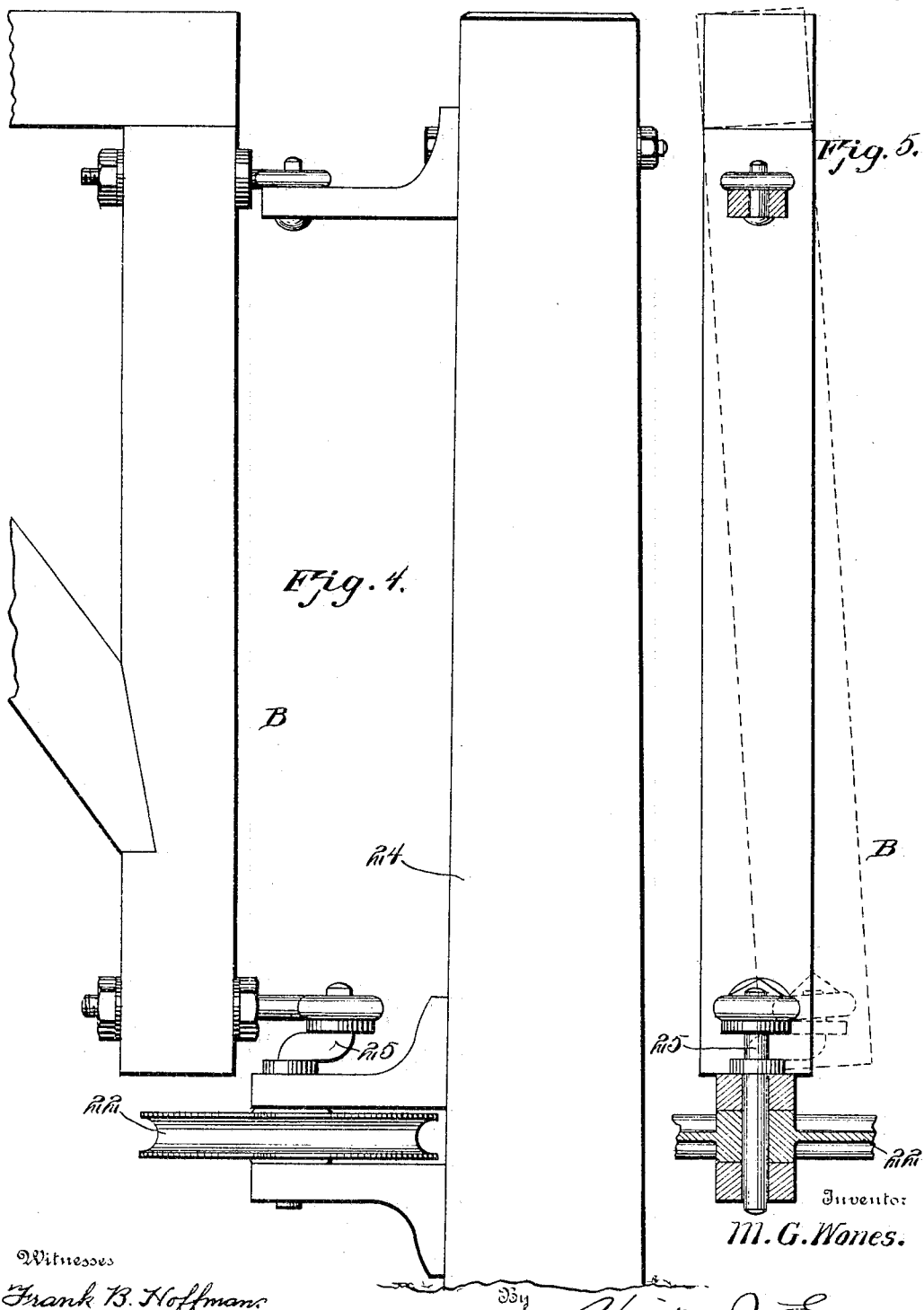

No. 782,093. PATENTED FEB. 7, 1905.
M. G. WONES.
GATE.
APPLICATION FILED SEPT. 17, 1904.
4 SHEETS—SHEET 4.
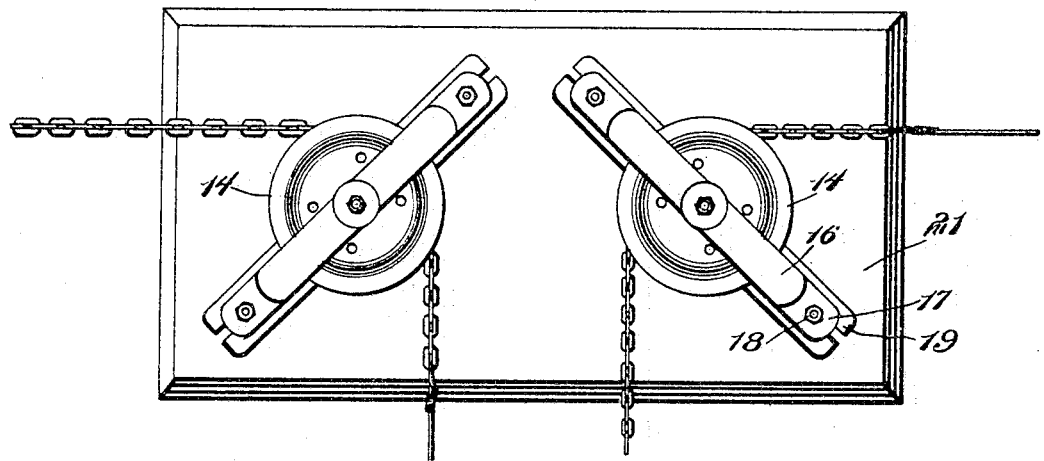
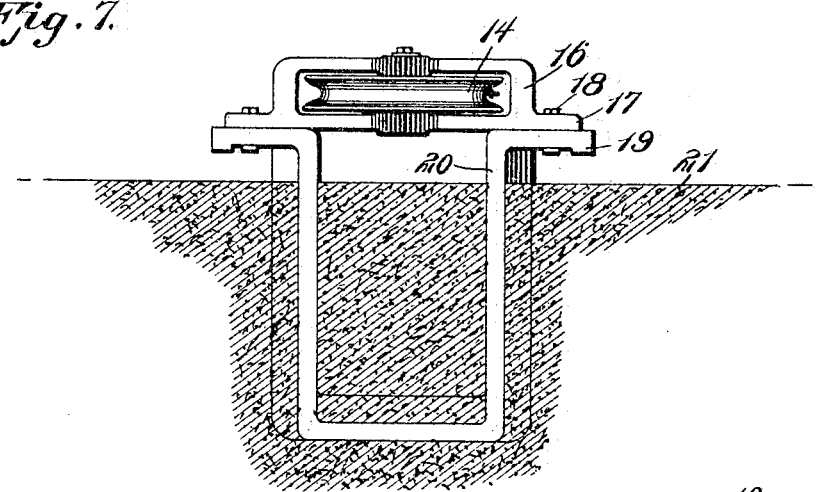
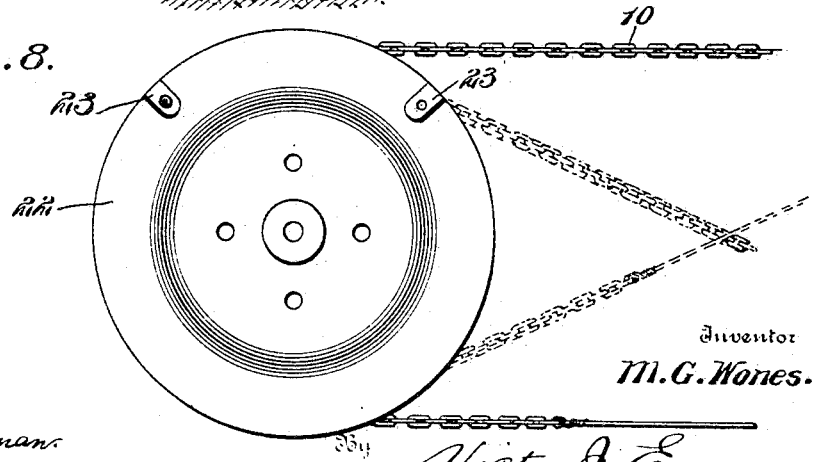
Witnesses
Frank B. Hoffman.
W. H. Clarke.
Inventor
M. G. Wones.
Victor J. Evans
Attorney No. 782,093.

Patented February 7, 1905.

UNITED STATES PATENT OFFICE.

MARTIN G. WONES, OF MAPLEWOOD, OHIO.

GATE.

SPECIFICATION forming part of Letters Patent No. 782,093, dated February 7, 1905.

Application filed September 17, 1904. Serial No. 224,809.

*To all whom it may concern:*

Be it known that I, MARTIN G. WONES, a citizen of the United States, residing at Maplewood, in the county of Shelby and State of Ohio, have invented new and useful Improvements in Gates, of which the following is a specification.

This invention relates to that class of gates in which a variable or swinging pivot is employed for the inner upright of the gate through the movement of which the gate is first tilted to disengage it from its latch and permitted to swing by gravity to an open or closed position.

The objects of the invention are to improve and simplify the construction of the variable pivot and of the means located upon the railroad-track for operating said variable pivot.

With the foregoing and other minor objects in view, which will appear as the description proceeds, the invention resides in a rotary member having thereon a crank which forms one of the supports of the gate and is adapted when given a quarter-turn to tilt the gate out of engagement with its latch and to disturb its center of gravity in such manner as to cause it automatically to swing from one position to another.

The invention also resides in a novel form of track-lever which is adapted to be moved from one position to another by a passing train and to actuate the variable pivot of the gate through suitable connecting means.

Furthermore, the invention resides in the particular combination and arrangement of parts and in the precise details of construction hereinafter described and claimed as a practical embodiment thereof.

In the accompanying drawings, forming part of this specification, Figure 1 is a plan view of a railway-crossing equipped with the improvements of the present invention. Fig. 2 is a plan view illustrating one of the track-levers in detail. Fig. 3 is a longitudinal vertical section through one of the track-levers. Fig. 4 is a side elevation showing the crank member on which the gate is mounted, a portion of the gate being broken away. Fig. 5 is an end elevation of the gate, showing in dotted lines the position to which the gate is moved when it is tilted out of engagement with its latch and caused to swing by gravity from one position to another. Fig. 6 is a plan view showing the manner of mounting the guide-sheaves for the flexible connection between the track-levers and the variable pivot of the gate. Fig. 7 is a vertical section through the concrete or other suitable material in which the support for each guide-sheave is embedded. Fig. 8 is a plan view of the rotary member or pulley which carries the crank by means of which the gate is opened and closed, said figure showing in dotted lines the manner of crossing the flexible element when it is desired to reverse the movement of the gate.

Like reference characters indicate corresponding parts throughout the several views.

The reference character A indicates a section of railroad-track, and B indicates a gate which is arranged to control the railroad-crossing. Pivotally mounted at 1 upon a cross-tie of the railroad is a track-lever 2, which at its free end is provided with a roller 3, as shown in Fig. 3. The free end of the lever 2 is adapted to swing upon a plate 4, fastened to one of the cross-ties. Attached to the lever 2 in any suitable manner, as by means of a bolt 5, is a bracket member 6, having downwardly-extending perforated ears or lugs through which extends a rod 7, having a collar 8 upon each end. A coil-spring 9 surrounds each end of the rod 7, one of said coil-springs being disposed on each side of the track-lever 2 and bearing at one end against one of the collars 8 and at the other end against one of the ears or lugs of the bracket 6. Attached in any suitable manner to each end of the rod 7 is a wire or flexible element 10, which connects with the novel form of variable pivot hereinafter described. A limiting member or chain 11 is also attached in any suitable manner to each end of the rod 7 and to a plate 12, which is bolted or otherwise suitably secured adjacent to one of the rails 13.

It will be understood that a track-lever such as described is disposed on each side of the railway-crossing, and the foregoing description of one lever is sufficient to convey an understanding of both.

The flexible element or wire 10 is connected with each of the levers 2 and extends around a plurality of guide sheaves or pulleys 14, a piece of chain 15 being preferably set into said flexible element adjacent to each of the pulleys 14. As shown in Fig. 7, each of the guide-pulleys 14, preferably, is journaled in a bracket 16, having ears or lugs 17, which are connected, by means of bolts 18, with slotted ears or lugs 19 upon a U-shaped bracket 20, firmly embedded in a mass 21 of concrete or other suitable material.

The flexible element 10 passes around a rotary member or pulley 22 and is clamped thereto by means of any suitable clamping device 23, which serves to prevent the flexible element from slipping upon the periphery of the rotary member 22. In the event that the flexible element is crossed, as shown by dotted lines in Fig. 8, to reverse the movement of the rotary member when the gate is mounted to swing in a direction opposite to that illustrated in the drawings the clamping device 23 is moved to the position shown by 23'. As shown in Fig. 4, the rotary member 22, which is mounted in any suitable manner upon a stationary gate-post 24, to which the gate B is connected, is provided with a crank member 25, which forms the variable pivot of the gate, said gate being connected with said crank member 25 in any suitable manner, as illustrated in Fig. 4.

Each of the gate-posts 26 and 27 is provided with a latch member 28, which is adapted to be engaged by a suitable latch 29 upon the gate B.

Constructed as above described the operation of the improved device is as follows: It will be understood that each locomotive which passes along the track A is provided with a suitable inclined bar which is adapted to strike the roller 3 upon one of the track-levers 2, thus swinging said lever from one position to another. It is only necessary that the movement of each track-lever be sufficient to impart to the crank-supporting member 22 a quarter-turn, which, as shown by the dotted lines in Fig. 5, causes the free end of the gate to tilt upward until it becomes disengaged from the latch member 26 and to swing from one position to another by reason of the fact that the movement of the crank member 25 causes the center of gravity of the gate to be disturbed. The movement of one track-lever 2 from one position to another causes the other track-lever to move simultaneously in the opposite direction. For this reason when the train strikes the second lever the crank-supporting member 22 is moved back into its original position and the gate is caused to swing in the opposite direction. The limiting elements or chains 11, which are connected with each of the levers 2, permit the inclined rod upon the locomotive to swing each lever only a sufficient distance to impart a quarter-turn to the crank-supporting member 22. In order that the inclined rod of the locomotive may clear the roller 3 after it has swung the lever a sufficient distance, the coil-springs 7 are provided, said springs 7 serving to permit the lever to swing out of engagement with the inclined rod on the locomotive after one or the other of the limiting-chains 11 has stopped the movement of the flexible element 10. After the train has passed the coil-spring 7 moves the track-lever 2 back into position to be engaged by the inclined rod of the next passing train.

I am aware that it is not broadly new to construct a gate with a stationary pivot at its upper portion and a variable pivot at its lower portion, and I do not claim this broadly as my invention. I do, however, claim the simplified and improved form of the lower variable pivot as herein described and illustrated.

Minor changes in the precise embodiment of invention illustrated and described may be made within the scope of the following claims without departing from the spirit of the invention or sacrificing any of its advantages.

Having thus described the invention, what is claimed, and desired to be secured by Letters Patent, is—

1. The combination of a track, a track element, a swinging gate having a variable pivot, a connection between the track element and variable pivot, and means for limiting the movement of the connection while permitting relative movement of the track element.

2. The combination of a track, a track-lever, a swinging gate having a variable pivot, a connection between the lever and variable pivot, and means for limiting the movement of the connection while permitting relative movement of the lever.

3. The combination with a railway-track, of a pair of track-levers, a rod loosely connected with each of the levers, and having a collar on each end thereof, a coil-spring surrounding each rod between each of the collars thereon and the lever, a limiting-chain connected with each end of the lever, a flexible element connected with the rod of each lever, a gate having a variable pivot member comprising a pulley, provided with a crank, said flexible element being connected with said pulley, and a gate-post having a latch adapted to be engaged by the gate.

In testimony whereof I affix my signature in presence of two witnesses.

MARTIN G. WONES.

Witnesses:
  GEORGE HERTLEY,
  B. W. CATON.